Dec. 24, 1929.                J. W. TAYLOR                1,740,795
                            WEIGHING APPARATUS
                           Filed June 18, 1928
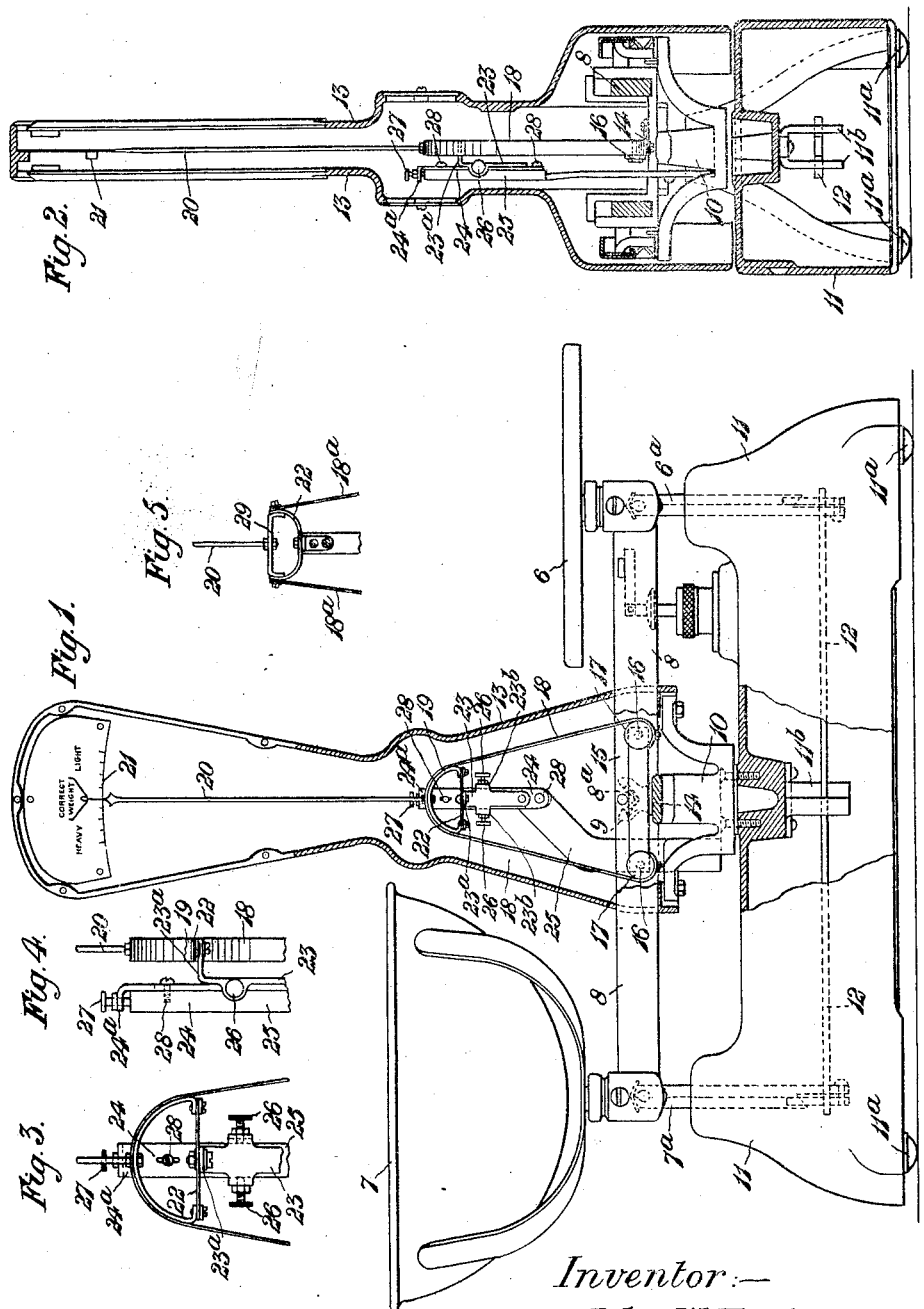
Inventor:—
John W. Taylor
by George E. Folkes.
his Attorney Patented Dec. 24, 1929

1,740,795

UNITED STATES PATENT OFFICE

JOHN WILLIAM TAYLOR, OF BIRMINGHAM, ENGLAND, ASSIGNOR TO W. & T. AVERY LIMITED, OF SOHO FOUNDRY, BIRMINGHAM, ENGLAND

WEIGHING APPARATUS

Application filed June 18, 1928, Serial No. 286,247, and in Great Britain July 2, 1927.

This invention has reference to improvements in or relating to weighing apparatus and is more particularly concerned with weighing apparatus of the kind employed for ascertaining whether and by how much a body or quantity of material is above or below a certain specified weight and which forms of weighing apparatus are technically known as "over and under scales".

The present invention has for its object the provision of an improved construction of weighing scale of the aforesaid kind which is simple in construction, efficient in operation and capable of being produced at a relatively low cost.

The invention consists of a weighing scale having a resistant in the form of a flexible strip which is either disposed in a horizontal plane or bent to a bow shape, said strip being anchored intermediate its ends to a relatively fixed portion of a scale and being secured adjacent its ends to a frame which is connected to an indicator, said frame also having connection with the weighbeam or lever system whereby an oscillation of the weighbeam or lever system produces a flexing of the resistant strip and a consequential movement of the indicator.

The invention also resides in the means for transmitting the motion of the weighbeam or lever system of the scale to the flexible resistant and in the means for obtaining the adjustment of the indicator.

The invention still further resides in the details of construction and in the scale as a whole.

The invention will now be described with particular reference to the accompanying sheet of drawings, wherein:—

Figure 1 is a part sectional front elevation of a weighing scale constructed in accordance with the invention.

Figure 2 is a part sectional end elevation of the scale seen in Figure 1.

Figure 3 is a detail view to an enlarged scale of the resistant strip and its adjacent parts.

Figure 4 is an end view of the parts seen in Figure 3.

Figure 5 is a detail view drawn to the same scale as Figures 1 and 2 of a modified construction of the resistant strip.

In the drawings like numerals of reference indicate similar parts in the several figures.

The weights pan 6 and the goods pan 7 are pivotally mounted in known manner on the ends of an even armed weighbeam 8 which is fulcrumed on knife-edges $8^a$ mounted in bearings 9 carried by a bracket 10 bolted to the upper side of a base housing 11 mounted on adjustable feet $11^a$ in the known manner.

The supports for the weights and goods pans 6 and 7 are provided with depending legs $6^a$ and $7^a$ respectively, said legs passing through apertures formed in the base housing 11 and being connected adjacent their lower ends to a stay 12. The stay 12 is fulcrumed on a downwardly depending projection $11^b$ located within the interior of the base housing 11 and secured thereto said stay serving to ensure a parallel motion of the scale pans 6 and 7 in known manner.

Supported from the bracket 10 is a vertically disposed casing 13 which serves to contain the indicating and resistant mechanism to be described hereinafter.

The weighbeam 8 has bolted thereto a bracket 14, said bracket carrying a horizontally disposed member 15 which is symmetrically disposed relatively to the line of the fulcrum knife-edges $8^a$ of the weighbeam 8. Secured to the ends of the member 15 by means of bolts 16 are a pair of rollers 17 to the peripheries whereof are anchored the lower ends of a flexible ribbon 18 an intermediate portion of which is passed over the periphery of a bow-shaped frame 19. This frame 19 is disposed above the weighbeam and has its vertical axis in the vertical plane containing the fulcrum line of the knife-edges 8ᵃ. Secured to the centre of the bow-shaped frame 19 is an index pointer 20 the index head whereof is disposed below and registers with a graduated chart 21 disposed within and supported from the housing 13 in accordance with the normal practice. The chart 21 is graduated on each face so that the index can be observed from each side of the scale. The lower ends of the bow-shaped frame 19 have clamped thereto the ends of a horizontally disposed flexible strip 22 the central portion whereof is anchored to the horizontal portion 23ᵃ of a bracket member 23 which is pivotally mounted on a plate 24 secured to a stay 25 carried by the bracket 10. The pivotal bracket member 23 is formed with inwardly turned earpieces 23ᵇ within which are formed screw boxes for screws 26 the noses whereof are inwardly directed and impinge on the edge of the plate 24 the said screws permitting of the adjustment of the flexible strip 22 in a horizontal direction in order to obtain a correct zero adjustment of the pointer 20. The plate 24 is provided at its upper end with a cranked portion 24ᵃ having formed therein a screw box for a screw 27 the nose whereof is downwardly directed and impinges on the upper end of the stay 25. The plate 24 is secured to the face of the stay 25 by means of screws 28 which are located within vertically disposed elongated slots formed in the plate 24 whereby by slackening the screws 28 and manipulating the screw 27 the point of anchorage of the flexible stay 22 may be adjusted in a vertical direction.

The bolts 16 securing the rollers 17 to the arms of the member 15 permit of the said rollers being turned for the purpose of enabling the tension of the ribbon 18 to be adjusted in order to obtain an equal pull from each side of the weighbeam, the bolts 16 being capable of being locked when the rollers are in any set position.

The operation of the invention is as follows:—

Upon the application of a load to the goods pan 7 if the load is above or below the weight deposited on the weights pan 6 an oscillation of the weighbeam 8 obtains which movement is transmitted through the flexible ribbon 18 to the bow-shaped frame 19 and produces a flexing of the strip 22 and a corresponding movement of the pointer 20 which registers on this chart 21 the amount by which the chart is above or below the specified weight.

In the modification illustrated in Figure 5 the resistant strip 22 is bent to a C or U shape the ends of the strip being clamped to the downwardly turned ends of a horizontally disposed bar 29 to the centre whereof is secured the indicating pointer 20. The downwardly turned ends of the bar 29 have also secured thereto the upper ends of flexible ribbons 18ᵃ the lower ends whereof are anchored to a member 15 in the manner of the lower ends of the ribbons 18 hereinbefore referred to.

What I claim is:—

1. A weighing scale comprising a lever system, a supporting member fixed relatively to said lever system, a flexible strip resistant anchored at its centre to said member, a frame secured to the ends of the strip resistant, an indicator carried by said frame and means for transmitting the motion of the lever system to the said frame.

2. A weighing scale embodying a lever system, a member fixed relatively to said lever system, a flexible strip resistant anchored at its centre to said member, a frame secured to the ends of the strip resistant, an indicator secured to said frame, means for transmitting the motion of the lever system to said frame and means for permitting of the adjustment of the point of anchorage of the strip resistant.

3. A weighing scale comprising a lever system, a supporting member fixed relatively to said lever system, a flexible strip resistant anchored at its centre to said supporting member, a frame secured to the ends of the said resistant, an indicator carried by said frame, flexible connecting means between the said frame and the lever system and means for effecting the adjustment of the flexible connecting means.

4. A weighing scale embodying a lever system, a supporting member fixed relatively to said lever system, a plate carried by the said supporting member and adjustable in a vertical plane, a bracket member pivotally connected to said plate, means for effecting the radial adjustment of said bracket member, a flexible strip resistant anchored at its centre to the said bracket member, a frame secured to the ends of the said resistant, an indicator carried by the frame and flexible connecting means between the said frame and the lever system.

5. A weighing scale embodying a base, a weighing lever fulcrum mounted on said base, a supporting member fixed to said base, a flexible strip resistant anchored at its centre to said supporting member, a frame secured to the ends of the strip resistant, an indicating pointer secured to the centre of said frame, means for effecting the adjustment of the point of anchorage of the flexible strip resistant, flexible connecting means between the frame and the weighing lever and means for effecting an adjustment of the flexible connecting means.

6. A weighing scale comprising a base, an even armed lever fulcrumed on said base, scale pans mounted on the ends of said lever, a supporting member fixed to said base, a flexible strip resistant anchored at its centre to said fixed member, means for effecting an adjustment of the point of anchorage of the said strip resistant, a frame fixed to the ends of said strip resistant, an indicating means secured at its lower end to the centre of the frame, a centrally disposed housing supported at its lower end from the base, a graduated chart located within the upper end of the housing and adapted to co-operate with said indicating means, connecting means between the even armed lever and the aforesaid frame and means for effecting an initial adjustment of the flexible supporting means.

In testimony whereof I have signed my name to this specification.

JOHN WILLIAM TAYLOR.